United States Patent
Xu et al.

(10) Patent No.: US 11,611,427 B2
(45) Date of Patent: Mar. 21, 2023

(54) OPTICAL LINK CHANNEL AUTO-NEGOTIATION METHOD AND APPARATUS, COMPUTER-READABLE STORAGE MEDIUM

(71) Applicant: ZTE Corporation, Shenzhen (CN)

(72) Inventors: Guoyang Xu, Shenzhen (CN); Huannan Ma, Shenzhen (CN); Bo Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 139 days.

(21) Appl. No.: 17/309,883

(22) PCT Filed: Dec. 27, 2019

(86) PCT No.: PCT/CN2019/129132
§ 371 (c)(1),
(2) Date: Jun. 25, 2021

(87) PCT Pub. No.: WO2020/135697
PCT Pub. Date: Jul. 2, 2020

(65) Prior Publication Data
US 2022/0060312 A1 Feb. 24, 2022

(30) Foreign Application Priority Data
Dec. 29, 2018 (CN) .......................... 201811634197.9

(51) Int. Cl.
*H04J 14/02* (2006.01)
*H04L 7/00* (2006.01)
*H04L 1/00* (2006.01)

(52) U.S. Cl.
CPC ........ *H04L 7/0075* (2013.01); *H04J 14/0227* (2013.01); *H04L 1/0072* (2013.01)

(58) Field of Classification Search
CPC .. H04L 7/0075; H04L 1/0072; H04J 14/0227; H04J 3/0697; H04J 14/02; H04B 10/079
See application file for complete search history.

(56) References Cited

U.S. PATENT DOCUMENTS

| 7,583,639 B2 * | 9/2009 | Mahany ............... H04W 28/22 370/335 |
| 11,388,270 B1 * | 7/2022 | Soma ...................... H04L 69/18 |

(Continued)

FOREIGN PATENT DOCUMENTS

| CN | 102546018 A | 7/2012 |
| CN | 104796801 A | 7/2015 |

(Continued)

OTHER PUBLICATIONS

International Search Report and Written Opinion for the International Patent Application No. PCT/CN2019/129132 dated Mar. 27, 2020.

(Continued)

*Primary Examiner* — Tanya T Motsinger
(74) *Attorney, Agent, or Firm* — Vivacqua Crane, PLLC

(57) ABSTRACT

An optical link channel auto-negotiation method and apparatus, a non-transitory computer-readable storage medium are disclosed. The optical link channel auto-negotiation method may include at least one of the following: configuring a receiving rate, determining whether a receive clock recovered from received data by a physical layer (PHY) module is locked, and in response to determining that the receive clock recovered from the received data by the PHY module is locked, determining that the receiving rate is configured correctly; configuring a first predetermined parameter in response to determining that the receiving rate is configured correctly, determining whether code block data of the PHY module is in a synchronized state, and in response to determining that the code block data of the PHY (Continued)

---

900: Configure a second predetermined parameter, determine whether code block data of a PHY module is in a synchronized state, and determine that the second predetermined parameter is configured correctly when the code block data of the PHY module is in a synchronized state, the second predetermined parameter comprising any one of the following: a receiving rate and a PCS coding mode; the receiving rate; and, an FEC mode and the PCS coding mode 901: Configure an uplink transmission wavelength when the second predetermined parameter is configured correctly, determine whether the link state of the PHY module is no fault warning, and determine that the uplink transmission wavelength is configured correctly when the link state of the PHY module is no fault warning module is in a synchronized state, determining that the first predetermined parameter is configured correctly.

18 Claims, 9 Drawing Sheets

(56) References Cited

U.S. PATENT DOCUMENTS

| | | | | |
|---|---|---|---|---|
| 2008/0034137 | A1* | 2/2008 | Whitby-Strevens | G06F 13/387 710/100 |
| 2009/0238320 | A1* | 9/2009 | Ji | H04J 3/0658 375/362 |
| 2011/0164881 | A1* | 7/2011 | Rajagopal | H04B 10/1149 398/128 |
| 2013/0183039 | A1 | 7/2013 | Hood et al. | |
| 2015/0092675 | A1* | 4/2015 | Choudhary | H04W 88/06 370/329 |
| 2015/0222533 | A1* | 8/2015 | Birrittella | H04L 45/66 370/392 |
| 2018/0159785 | A1* | 6/2018 | Wu | H04J 3/1658 |
| 2019/0020466 | A1* | 1/2019 | Raymond | H04B 10/40 |
| 2021/0143972 | A1* | 5/2021 | Mann | H04L 12/413 |
| 2022/0060312 | A1* | 2/2022 | Xu | H04J 14/0227 |
| 2022/0248353 | A1* | 8/2022 | Liu | H04J 3/0667 |
| 2022/0360355 | A1* | 11/2022 | Masumoto | H04J 14/0226 |
| 2022/0368599 | A1* | 11/2022 | Thorup | G06F 30/34 |
| 2022/0377703 | A1* | 11/2022 | Yao | H04W 72/02 |
| 2022/0377744 | A1* | 11/2022 | Zhang | H04W 72/042 |

FOREIGN PATENT DOCUMENTS

| | | |
|---|---|---|
| CN | 108075937 A | 5/2018 |
| CN | 108966054 A | 12/2018 |

OTHER PUBLICATIONS

European Patent Office. Extended European Search Report for EP Application No. 19905188.9, dated Jan. 14, 2022, pp. 1-13.

* cited by examiner

OPTICAL LINK CHANNEL AUTO-NEGOTIATION METHOD AND APPARATUS, COMPUTER-READABLE STORAGE MEDIUM

CROSS-REFERENCE TO RELATED APPLICATION

This application is a national stage filing under 35 U.S.C. § 371 of international application number PCT/CN2019/129132, filed Dec. 27, 2019, which claims priority to Chinese patent application No. 201811634197.9, filed Dec. 29, 2018. The contents of these applications are incorporated herein by reference in their entirety.

TECHNICAL FIELD

The present disclosure relates to, but not limited to, the field of optical access, and more particularly to an optical link channel auto-negotiation method and apparatus, and a computer-readable storage medium.

BACKGROUND

With the advent of the 5G era, users' requirements for data bandwidth and time delay are increasing, and the requirements for optical access devices are also increasing. One of methods to improve bandwidth is to modulate data to a plurality of wavelength channels by wavelength division multiplexing (WDM) so as to increase the communication capacity. Each end user in WDM occupies one wavelength individually, and different end users access by wavelength division multiplexing, so that the time delay caused by dynamically bandwidth assignment (DBA) is effectively avoided, and the access requirements of high capacity and low time delay are satisfied. With the increase in the modulation rate of a single wavelength, the bandwidth for each end user can also increase continuously, thus, the total throughput also increases continuously.

Referring to FIG. 1, which is a diagram of a network structure in the existing technology. As shown in FIG. 1, the wavelength division multiplexer may be realized by an arrayed waveguide grating (AWG) or other devices. When the local device is an optical line terminal (OLT) and the remote device is an optical network unit (ONU), the network is a wavelength division multiplexing passive optical network (WDM-PON). The network may also be a centralized wireless forwarding network. In this case, the local device is a building base band unit (BBU), and the remote device is a radio remote unit (RRU).

Optical signals of the local device and the remote device are realized by optical modules. Optical signals with different wavelengths are realized by optical modules with different wavelengths, which are connected to different ports of the wavelength division multiplexer (WDMer). Generally, the optical module on the local device may adopt a fixed-wavelength optical module or an adjustable optical module, and the optical module on the remote device may adopt an adjustable optical module to reduce the cost for maintenance and operation.

During deployment, after the wavelength of the local device is configured, an optical module with a corresponding wavelength is connected to a corresponding port of the AWG. However, after the remote device is connected to the AWG, the following two problems will occur.

a) The remote device does not know the rate, coding mode and forward error correction (FEC) mode of downlink data transmitted by the local device, so it cannot be ensured that the downlink data is received normally.

b) The remote device may not know which port it is connected to and optical signals of which wavelength should be transmitted.

In view of the above two situations, the following two approaches are usually employed.

One is that the rate, coding code and FEC code of uplink and downlink data and the transmitted wavelength are configured manually on the remote device. However, it is very labor-intensive and inefficient.

The other is that the local device automatically transmits the rate, coding code and FEC code of downlink data, the transmitted wavelength and other information to the remote device. Then, the remote device performs configuration according to the transmitted parameters so as to open channels. However, in this case, complex protocols may need to be defined, and modulation and demodulation processing are to be added on both the local device and the remote device, greatly increasing the complexity and cost of the system.

SUMMARY

Some embodiments of the present disclosure provide an optical link channel auto-negotiation method and apparatus, and a computer-readable storage medium, which can simply realize the automatic adaptation establishment of an optical link channel.

Some embodiments of the present disclosure provide an optical link channel auto-negotiation method, which includes at least one of the following:

configuring a receiving rate, determining whether a receive clock recovered from received data by a physical layer (PHY) module is locked, and in response to determining that the receive clock recovered from the received data by the PHY module is locked, determining that the receiving rate is configured correctly;

configuring a first predetermined parameter in response to determining that the receiving rate is configured correctly, determining whether code block data of the PHY module is in a synchronized state, and in response to determining that the code block data of the PHY module is in a synchronized state, determining that the first predetermined parameter is configured correctly, the first predetermined parameter comprising any one of the following: a physical coding sublayer (PCS) coding mode; or, a forward error correction (FEC) mode and the PCS coding mode; and configuring an uplink transmission wavelength in response to determining that the receiving rate is configured correctly and the first predetermined parameter is configured correctly, determining whether the link state of the PHY module is no fault warning, and in response to determining that the link state of the PHY module is no fault warning, determining that the uplink transmission wavelength is configured correctly.

Some embodiments of the present disclosure provide an optical link channel auto-negotiation method, which includes at least one of the following:

configuring a second predetermined parameter, determining whether code block data of a physical layer (PHY) module is in a synchronized state, and in response to determining that the code block data of the PHY module is in a synchronized state, determining that the second predetermined parameter is configured correctly, the second predetermined parameter comprising any one of the following: a receiving rate and a physical coding sublayer (PCS) coding
} mode; the receiving rate; or, a forward error correction (FEC) mode and the PCS coding mode; and configuring an uplink transmission wavelength in response to determining that the second predetermined parameter is configured correctly, determining whether the link state of the PHY module is no fault warning, and in response to determining that the link state of the PHY module is no fault warning, determining that the uplink transmission wavelength is configured correctly.

Some embodiments of the present disclosure provide an optical link channel auto-negotiation apparatus, which includes at least one of the following:

a receiving rate configuration module configured to: configure a receiving rate, determine whether a receive clock recovered from received data by a physical layer (PHY) module is locked, and in response to determining that the receive clock recovered from the received data by the PHY module is locked, determine that the receiving rate is configured correctly;

a physical coding sublayer (PCS) coding mode configuration module configured to: configure a first predetermined parameter in response to determining that the receiving rate is configured correctly, determine whether code block data of the PHY module is in a synchronized state, and in response to determining that the code block data of the PHY module is in a synchronized state, determine that the first predetermined parameter is configured correctly, the first predetermined parameter comprising any one of the following: a PCS coding mode; or, a forward error correction (FEC) mode and the PCS coding mode; and a first uplink transmission wavelength configuration module configured to: configure an uplink transmission wavelength in response to determining that the receiving rate is configured correctly and the first predetermined parameter is configured correctly, determine whether the link state of the PHY module is no fault warning, and in response to determining that the link state of the PHY module is no fault warning, determine that the uplink transmission wavelength is configured correctly.

Some embodiments of the present disclosure provide an optical link channel auto-negotiation apparatus, which includes at least one of the following:

a receiving and coding configuration module configured to: configure a second predetermined parameter, the second predetermined parameter comprising any one of the following: a receiving rate and a physical coding sublayer (PCS) coding mode; the receiving rate; or, a forward error correction (FEC) mode and the PCS coding mode;

determine whether code block data of a physical layer (PHY) module is in a synchronized state, and in response to determining that the code block data of the PHY module is in a synchronized state, determine that the second predetermined parameter is configured correctly; and a second uplink transmission wavelength configuration module configured to: configure an uplink transmission wavelength in response to determining that the second predetermined parameter is configured correctly, determine whether the link state of the PHY module is no fault warning, and in response to determining that the link state of the PHY module is no fault warning, determine that the uplink transmission wavelength is configured correctly.

Some embodiments of the present disclosure provide an optical link channel auto-negotiation apparatus, which includes a processor and a computer-readable storage medium storing instructions which, when executed by the processor, cause the processor to perform any one of the above-mentioned optical link channel auto-negotiation methods.

Some embodiments of the present disclosure provide a computer-readable storage medium storing computer programs which, when executed by a processor, cause the processor to perform any of the above-mentioned optical link channel auto-negotiation methods.

BRIEF DESCRIPTION OF DRAWINGS

The accompanying drawings are used for providing further understanding of the technical schemes in the embodiments of the present disclosure, and constitute a part of the description. The accompanying drawings are used with the embodiments of the present disclosure to explain rather than limit the technical schemes in the embodiments of the present disclosure.

DETAILED DESCRIPTION

Hereinafter, embodiments of the present disclosure will be described below in detail with reference to the drawings. It should be noted that the embodiments of the present disclosure and features of the embodiments may be arbitrarily combined with each other in case of no conflict.

The steps shown in the flowcharts in the accompanying drawings may be executed in a computer system, for example, a set of computer-executable instructions. Moreover, although a logical order is shown in the flowcharts, in some cases, the steps shown or described may be executed in an order different from the logical order.

In the case of excluding physical connection errors, device damage and other abnormalities, main factors influencing the correct receiving of a downlink data signal by a remote device include: the receiving rate, PCS coding mode and FEC mode of the downlink signal. In a case where the remote device can correctly receive downlink data signals from a local device, necessary parameters such as uplink transmission wavelength of the remote device need to be configured, such that the remote device can correctly transmit uplink data signals to the local device.

The operating principles of these factors and the actual system networking mode will be described below.

Figure 1:
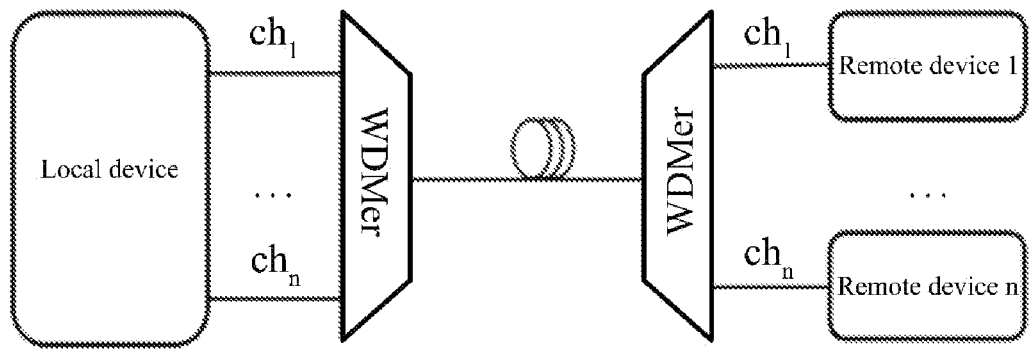
FIG. 1 is a diagram of a network structure in the existing technology.
Figure 2:
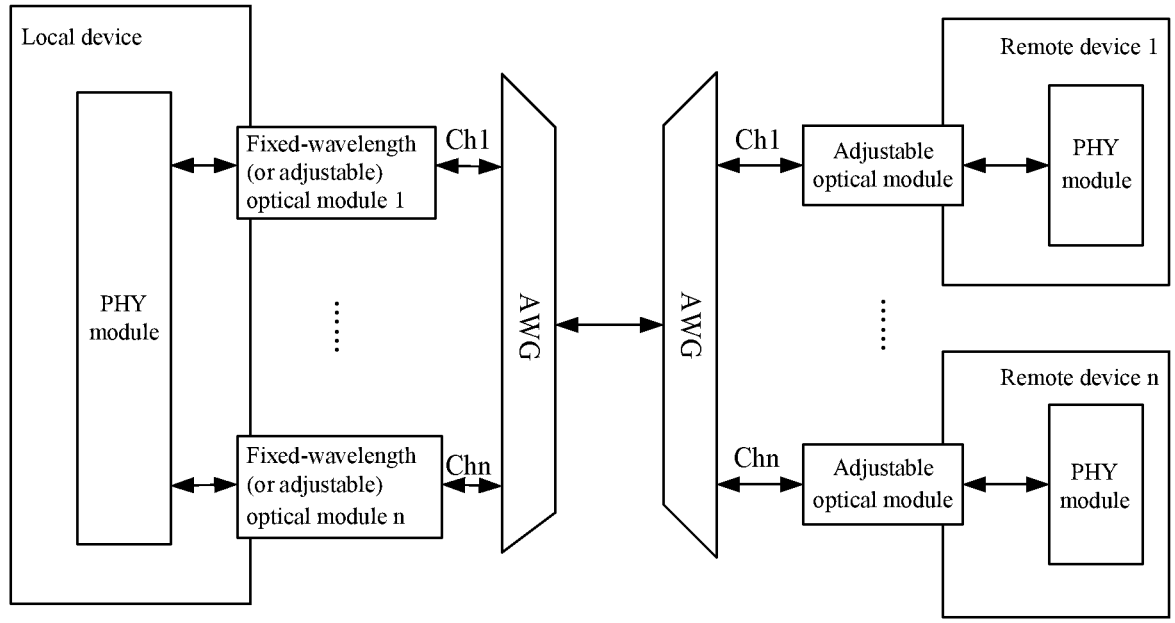
FIG. 2 is a schematic diagram of communication between a local device and a remote device according to an embodiment of the present disclosure.

FIG. 2 is a schematic diagram of communication between a local device and a remote device according to an embodiment of the present disclosure. As shown in FIG. 2, optical signals of the local device and the remote device are realized by optical modules. Optical signals with different wavelengths are realized by optical modules with different wavelengths, and optical modules with different wavelengths are connected to different ports of the WDMer. Generally, the optical module on the local device may adopt a fixed-wavelength optical module or an adjustable optical module, and the optical module on the remote device may adopt an adjustable optical module to reduce the cost for maintenance and operation.

Generally, the optical modules are connected to a PHY module to realize access channels of the Ethernet.

Figure 3:
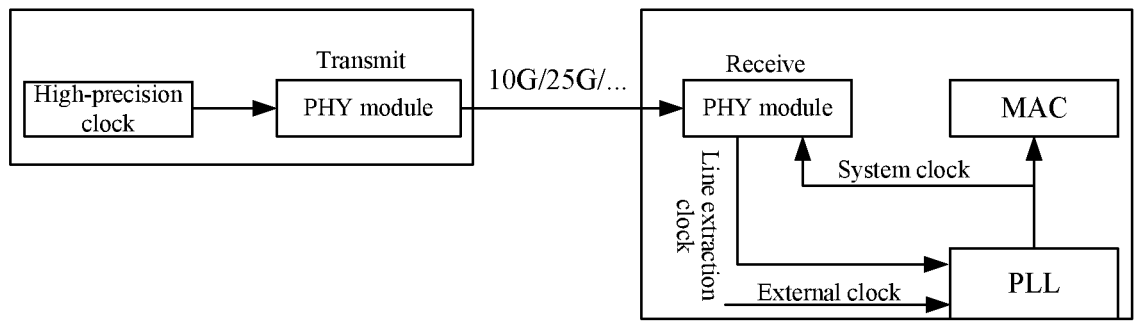
FIG. 3 is a schematic diagram of an operating principle of a clock according to an embodiment of the present disclosure.

FIG. 3 is a schematic diagram of an operating principle of a clock according to an embodiment of the present disclosure. As shown in FIG. 3, a receive clock (i.e., a line extraction clock in FIG. 3) defined in the IEEE 802.3 standard is a reference clock that provides continuous transmission of received data from a PHY sublayer to a reconciliation sublayer (RS). The receive clock is also driven by the PHY module and may be extracted from the received data, or may be driven by a nominal reference clock. Since there are always downlink signals on the local device, when the PHY module of the remote device can recover the receive clock from the received data and the receive clock is normally locked by a clock phase locked loop (PLL), it is considered that a receiving rate of the downlink signals is matched with a current configuration of a receiving rate of the remote device, that is, the receiving rate is configured correctly. When the PHY module of the remote device cannot recover the receive clock from the received data or the receive clock is not locked, it is considered that the receiving rate of the downlink signals is not matched with the current configuration of the receiving rate of the remote device, that is, the receiving rate is configured incorrectly.

Based on the above analysis, the remote device can determine whether the receiving rate is configured correctly only by inquiring whether the receive clock of the PHY module is locked, after the PHY module has configured a certain receiving rate mode. Therefore, a plurality of rate modes can be automatically traversed according to common service scenarios, for example: (25.78125G (25G Enternet)→10.3125G (10G Enternet)→24.33024G (CPRI Option 10)→10.1376G (CPRI Option 8)→9.8304G (CPRI Option 7), to determine the receiving rate of the received downlink signals is determined.

Figure 4:
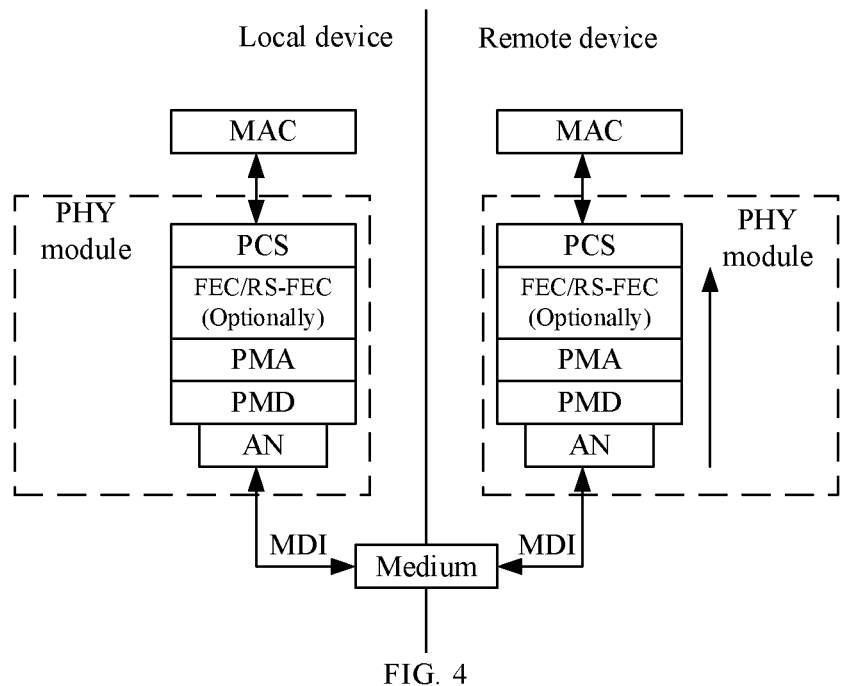
FIG. 4 is a schematic diagram of a protocol layer for communication between a local device and a remote device according to an embodiment of the present disclosure.

FIG. 4 is a schematic diagram of a protocol layer for communication between a local device and a remote device according to an embodiment of the present disclosure. As shown in FIG. 4, the PHY module includes: a PCS, a FEC/Reed Solomon Forward Error Correction (RS-FEC) sublayer (optionally), a physical medium attachment (PMA) sublayer, a physical media dependent sublayer (PMD) sublayer and an auto-negotiation (AN) sublayer.

The direction of arrow in FIG. 4 is the receiving direction of the remote device. After serial data transmitted from an optical fiber (medium) is descrambled by a descrambler (i.e., the PMD sublayer), the serial data is transmitted from the PMA sublayer to the FEC/RS-FEC sublayer and subjected to FEC frame synchronization and FEC decoding (e.g., RS (528,514), Fire code (2112, 2080), etc.) in the FEC/RS-FEC sublayer. If necessary, error correction needs to be performed. Then, the data is transmitted to the PCS and subjected to serial-to-parallel conversion, framing and decoding in the PCS (e.g., 8B/10B, 64B/66B, etc.).

The FEC/RS-FEC sublayer is optional, that is, it can be opened or closed. Moreover, generally, the FEC/RS-FEC sublayer is needed for only the PCSs of 10G Base-R, 40G Base-R and 100G Base-R.

Figure 5:
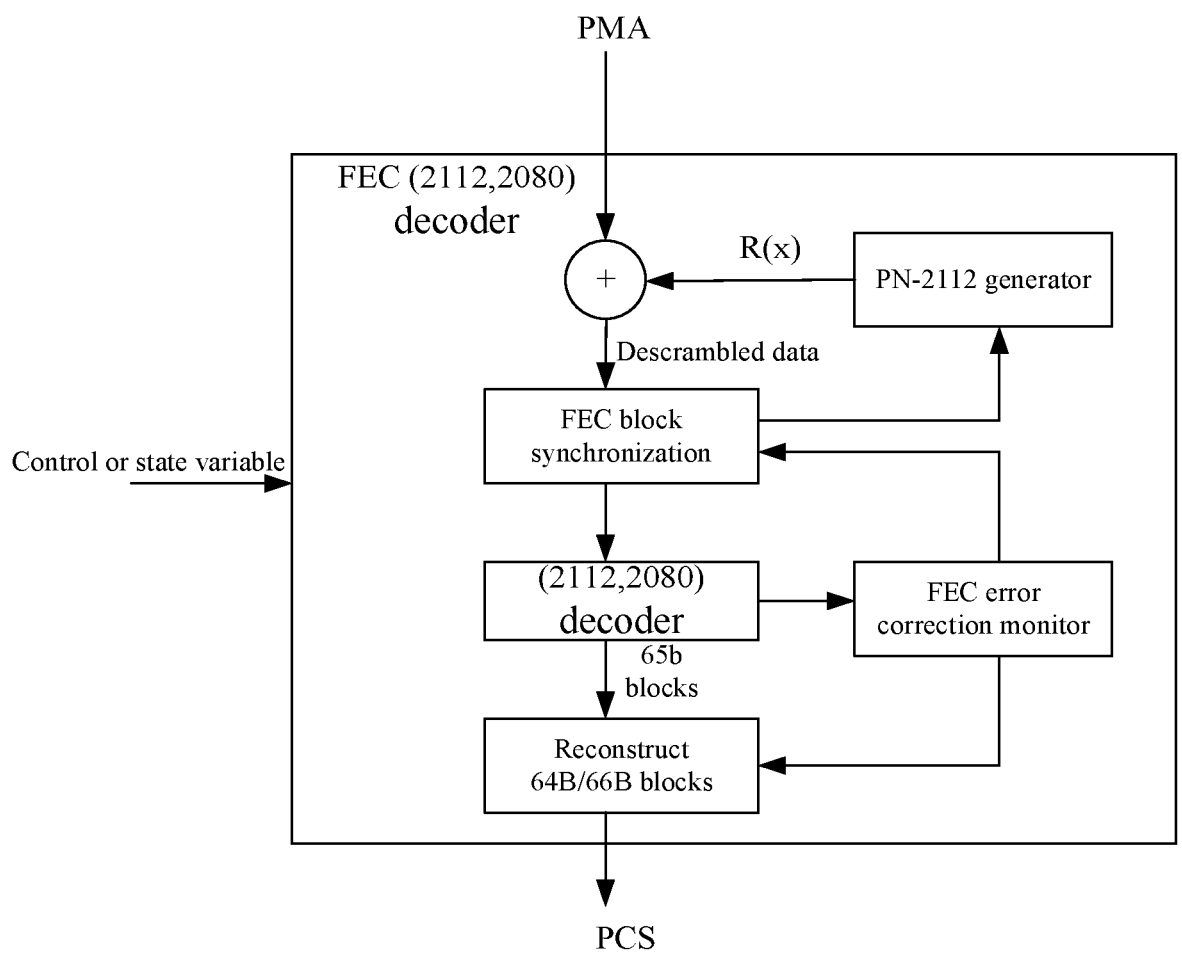
FIG. 5 is a flowchart of FEC (2112, 2008) data synchronization and decoding defined in the Institute of Electrical and Electronics Engineers (IEEE) 802.3 standard according to an embodiment of the present disclosure.

The FEC introduces redundancy into the coded data, so that a decoder (i.e., the FEC/RS-FEC sublayer) can check and correct transmission errors. RS-FEC coding is enhanced FEC coding. RS-FEC is block-based coding which takes a data block with a fixed size and adds additional redundant bits at its end. The FEC decoder uses these additional bits to process data streams, find errors, correct errors and acquire original data, for example, Fire code (2112, 2080). FIG. 5 is a flowchart of FEC (2112, 2080) data synchronization and decoding defined in the IEEE 802.3 standard according to an embodiment of the present disclosure. As shown in FIG. 5, upon receiving data, the FEC sublayer performs frame synchronization according to an FEC code block (2112 bits) and then decodes the data after synchronization. 32 data blocks of 65 bits (the first bit is a transcoding bit) are extracted from each frame, and the data blocks of 65 bits are checked and corrected by using redundant bits in the data blocks of 65 bits, and the transcoding bit is negated and then added ahead of the data blocks of 65 bits. Thus, a 64B/66B coded data block is formed, and then transmitted to the PCS for decoding. In other words, if the FEC/RS-FEC sublayer can perform stable frame synchronization in the receiving direction, the FEC mode in the receiving direction can be confirmed.

Figure 6:
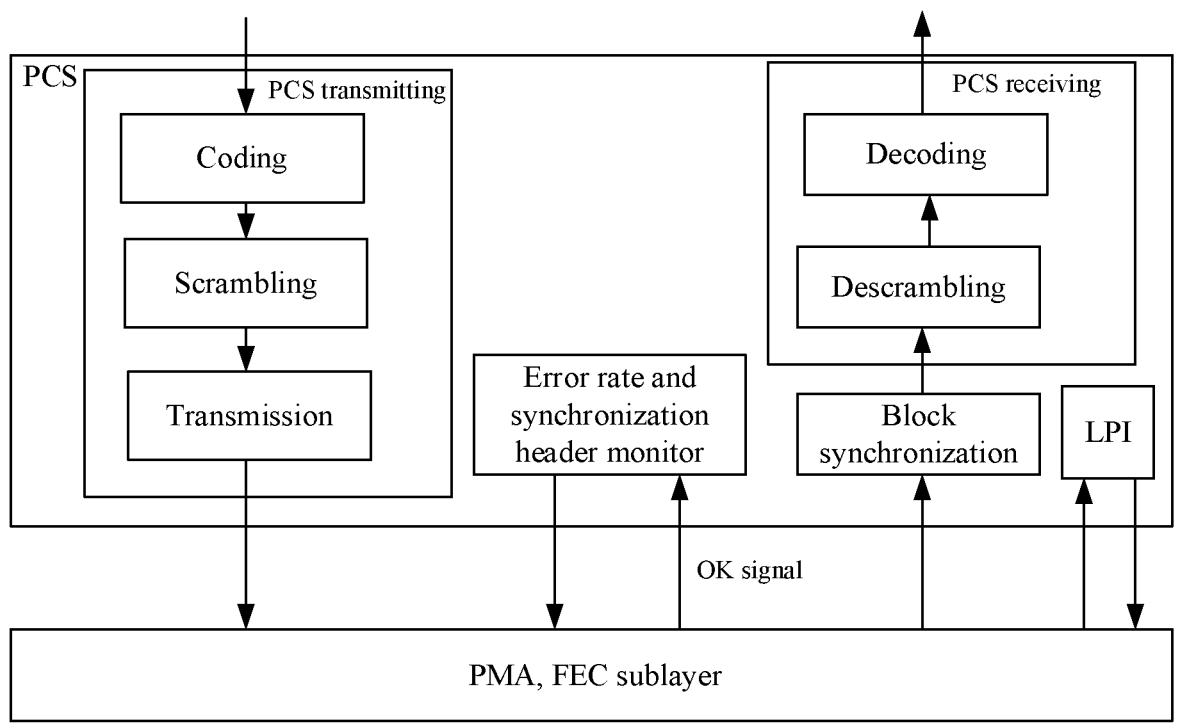
FIG. 6 is a flowchart of coding/decoding of a PCS sublayer defined in the IEEE 802.3 standard.

FIG. 6 is a flowchart of coding/decoding of the PCS sublayer defined in the IEEE 802.3 standard. As shown in FIG. 6, 64B/66B coding is a 64B/66B coding technology proposed for 10G Ethernet by the IEEE 802.3 work group in order to decrease the coding overhead, reduce the complexity of hardware and serve as an alternative of 8B/10B coding to support new programs and data. At present, 64B/66B coding is mainly applied to fiber channel 10G FC and 16G FC, 10G Ethernet, 100G Ethernet, 10G Ethernet passive optical network (EPON), InfiniBand, Thunderbolt and Aurora protocol of Xilinx. In the 64B/66B coding, 64-bit data or control information are coded into 66-bit blocks for transmission. First two bits of the 66-bit blocks represent a synchronization header, which is mainly used for the data alignment of a receiving terminal and the synchronization of the received data bit stream. In other words, if the PCS can perform stable data synchronization, the PCS coding mode in the receiving direction can be confirmed.

Figure 7:
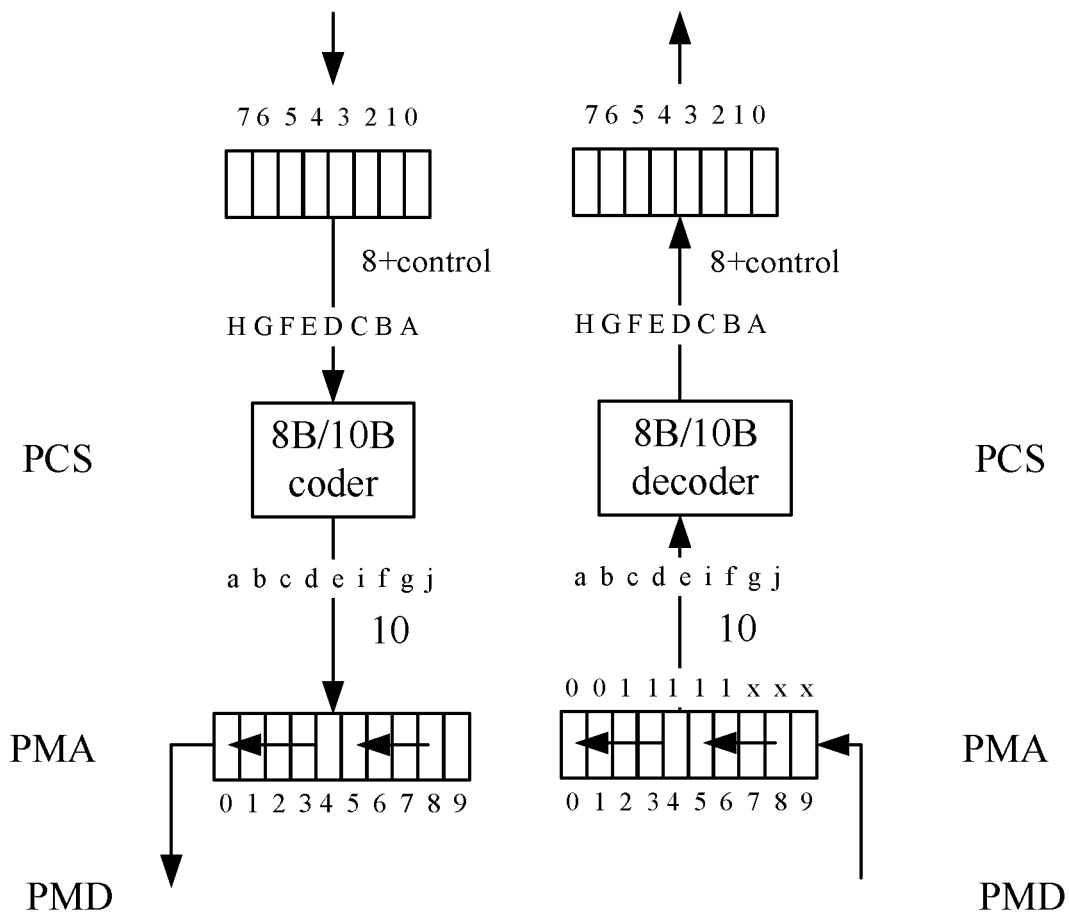
FIG. 7 is an illustration of 8B/10B coding/decoding according to an embodiment of the present disclosure.

FIG. 7 is an illustration of 8B/10B coding/decoding according to an embodiment of the present disclosure. As shown in FIG. 7, 8B/10B coding, as a coding mode frequently used in many high-speed serial communications at present, is intuitively interpreted as coding 8-bit data into 10-bit data for transmission. By using 8B/10B coding, the number of "0" and "1" transmitted is allowed to be basically the same, and the number of consecutive "0" or "1" does not exceed 5, that is, one "0" or "1" must be interposed after every 5 consecutive "0" or "1". Thus, the balance of signal direct current (DC) is ensured, and no DC imbalance will occur when the link times out. By 8B/10B coding, it can be ensured that a transmitted data string can be correctly recovered at the receiving terminal. If the PCS employs the 8B/10B coding mode, before receiving data, data alignment is performed firstly, and 8B/10B coding is then performed. Therefore, if data alignment can be performed stably, the current PCS coding mode can also be confirmed.

Based on the above signal receiving process, the remote device only needs to configure the PCS coding mode and the FEC mode in the receiving direction, and can thus determine whether the PCS coding mode and the FEC mode are configured correctly by acquiring the corresponding data synchronization state (or data alignment state). Therefore, by traversing combined configurations of several optional PCS coding modes and FEC modes according to the optical transmission scenario (particularly the wireless forwarding service scenario) of wavelength division multiplexing, the remote device can confirm the PCS coding mode and FEC mode in the receiving direction. For example, 64B/66B+ RS-FEC (528, 514)→64B/66B+FEC (2112, 2080)→64B/66B+no FEC→8B/10B+no FEC.

Finally, in a case where the remote device can normally receive downlink data from the local device, generally, the local device can remotely transmit necessary parameters such as uplink transmission wavelength for configuration of the remote device. However, in this mode, modulation and demodulation protocols need to be defined on both the local device and the remote device, so that the complexity and development cost of the system are increased. For a 5G forwarding service scenario, it can be realized in a simpler and more convenient way.

The link error signal is clearly defined in the IEEE 802.3 standard. That is, when the local terminal gives a warning, a physical sublayer in the PHY module will detect a local fault. When a RS layer is reached, the RS will stop transmitting media access control (MAC) data or low power idle (LPI) to an opposite terminal, and continuously generate and transmit a command Remote Fault to the RS of the opposite terminal. Upon receiving the Remote Fault, the RS of the opposite terminal also stops transmitting MAC data or LPI, and continuously generates IDLE control characters. However, when the RS does not receive Remote Fault or Local Fault any more, the OK state is recovered, and the MAC data or LPI is continuously transmitted to the opposite terminal by a physical layer signaling (PLS) service interface.

Generally, when abnormalities such as loss of signal (LOS), wavelength loss of lock or PCS alignment failure occur in the optical module, the RS sublayer of the PHY module will continuously transmit Remote Fault to the opposite terminal. Therefore, in a case where the optical module or other devices operate normally and the physical link connection is normal, if the receiving direction of the terminal is normal, it can be confirmed whether the transmission wavelength of the terminal is correct by inquiring whether there is Remote Fault warning.

Based on the above analysis, after configuring a certain transmission wavelength, the remote device can confirm whether the transmission wavelength is appropriate by inquiring whether the link state of the PHY of the terminal is Remote Fault. Thus, without providing additional devices, complex modulation and demodulation processing for the local device and the remote device and manual participation in configuration, the corresponding uplink transmission wavelength can be quickly found only by adding a transmission wavelength traversing process on the remote device side based on the link detection mechanism of the PHY module in the existing technology.

Figure 8:
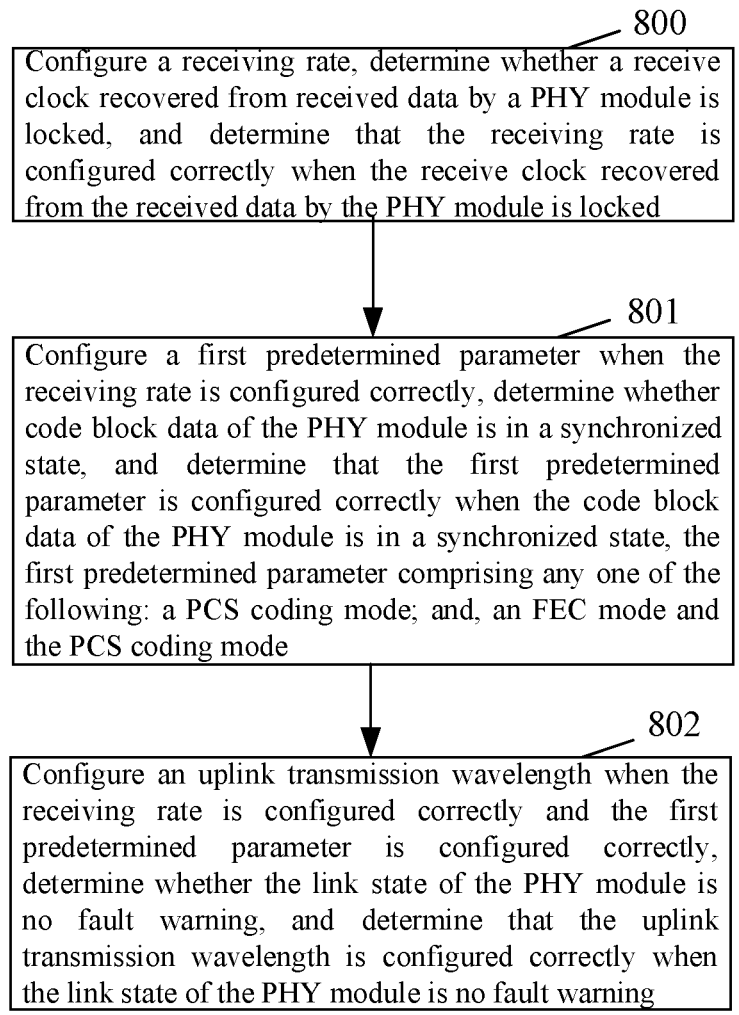
FIG. 8 is a flowchart of an optical link channel auto-negotiation method according to an embodiment of the present disclosure.

Referring to FIG. 8, an embodiment of the present disclosure provides an optical link channel auto-negotiation method, including at least one of the following steps S800, S801 and S802.

At step S800, a receiving rate is configured; and, it is determined whether a receive clock recovered from received data by a PHY module is locked, and it is determined that the receiving rate is configured correctly when the receive clock recovered from the received data by the PHY module is locked.

In the embodiment of the present disclosure, when the receiving rate is configured initially, the receiving rate may be configured as a default value or a previous matched value. When there is no default value or a previous matched value, an optional value may be arbitrarily selected for configuration.

At step S801, a first predetermined parameter is configured when the receiving rate is configured correctly; and, it is determined whether code block data of the PHY module is in a synchronized state, and it is determined that the first predetermined parameter is configured correctly when the code block data of the PHY module is in a synchronized state, the first predetermined parameter including any one of the following: a PCS coding mode; or, an FEC mode and the PCS coding mode.

In the embodiment of the present disclosure, when the PCS coding mode is configured initially, the PCS coding mode may be configured as a default value or a previous matched value. When there is no default value or a previous matched value, an optional value may be arbitrarily selected for configuration.

At step S802, an uplink transmission wavelength is configured when the receiving rate is configured correctly and the first predetermined parameter is configured correctly; and, it is determined whether the link state of the PHY module is no fault warning, and it is determined that the uplink transmission wavelength is configured correctly when the link state of the PHY module is no fault warning.

In the embodiment of the present disclosure, when the uplink transmission wavelength is configured initially, the uplink transmission wavelength may be configured as a default value or a previous matched value. When there is no default value or a previous matched value, an optional value may be arbitrarily selected for configuration.

In the embodiment of the present disclosure, the method includes at least one of the following: configuring a receiving rate; determining whether a receive clock recovered from received data by a PHY module is locked, and determining that the receiving rate is configured correctly when the receive clock recovered from the received data by the PHY module is locked; configuring a first predetermined parameter when the receiving rate is configured correctly; determining whether code block data of the PHY module is in a synchronized state, and determining that the first predetermined parameter is configured correctly when the code block data of the PHY module is in a synchronized state; configuring an uplink transmission wavelength when the receiving rate is configured correctly and the first predetermined parameter is configured correctly; and, determining whether the link state of the PHY module is no fault warning, and determining that the uplink transmission wavelength is configured correctly when the link state of the PHY module is no fault warning. The first predetermined parameter includes any one of the following: a PCS coding mode; and, an FEC mode and the PCS coding mode. In the embodiment of the present disclosure, without additionally adding modulation and demodulation processing on the local terminal and the remote terminal and defining complex protocols, the receiving rate, the first predetermined parameter and the uplink transmission wavelength are adaptively configured only by using the existing functions of the PHY module. Thus, the automatic adaptation and establishment of an optical link channel is realized simply, the cost for development and maintenance is reduced, and it is convenient for intercommunication of devices from different manufacturers.

In the embodiment of the present disclosure, since the FEC/RS-FEC sublayer is an optional sublayer, it is unnecessary to configure the FEC mode when there is no FEC/RS-FEC sublayer. That is, the receiving rate, the PCS coding mode and the uplink transmission wavelength are configured by the method described above.

When there is an FEC/RS-FEC sublayer, it is necessary to configure the FEC mode, so that the receiving rate, the FEC mode, the PCS coding mode and the uplink transmission wavelength are configured by the following method.

When the receiving rate is configured correctly, the method further includes the following:
    configuring the FEC mode, determining whether received data of an FEC or RS-FEC sublayer of the PHY module is in a synchronized state, and determining that the FEC mode is configured correctly when the received data of the FEC or RS-FEC sublayer of the PHY module is in a synchronized state; and
    when the receiving rate is configured correctly and the FEC mode is configured correctly, continuously executing the step of configuring the PCS coding mode.

In the embodiment of the present disclosure, when the FEC mode is configured initially, the FEC mode may be configured as a default value or a previous matched value. When there is no default value or a previous matched value, an optional value may be arbitrarily selected for configuration.

In another embodiment of the present disclosure, when the received data of the FEC or RS-FEC sublayer of the PHY module is not in a synchronized state, the method further includes the following steps:
    determining that the FEC mode is configured incorrectly; and
    reconfiguring the FEC mode, and continuously executing the step of determining whether the received data of the EFC or RS-FEC sublayer of the PHY module is in a synchronized state.

In another embodiment of the present disclosure, when it is determined that the receive clock recovered from the received data by the PHY module is not locked, the method further includes the following steps:
    determining that the receiving rate is configured incorrectly; and
    reconfiguring the receiving rate, and continuously executing the step of determining whether the receive clock recovered from the received data by the PHY module is locked.

In another embodiment of the present disclosure, when the code block data of the PHY module is not in a synchronized state, the method further includes the following steps:
    determining that the first predetermined parameter is configured incorrectly; and
    reconfiguring the first predetermined parameter, and continuously executing the step of determining whether the code block data of the PHY module is in a synchronized state.

In another embodiment of the present disclosure, when the link state of the PHY module is remote fault warning, the method further includes the following steps:
    determining that the uplink transmission wavelength is configured incorrectly; and
    reconfiguring the uplink transmission wavelength, and continuously executing the step of determining whether the link state of the PHY module is no fault warning.

In another embodiment of the present disclosure, when an optical module is in place or detects light or no loss of signal (LOS) warning, the step of configuring the receiving rate is continuously executed.

Figure 9:
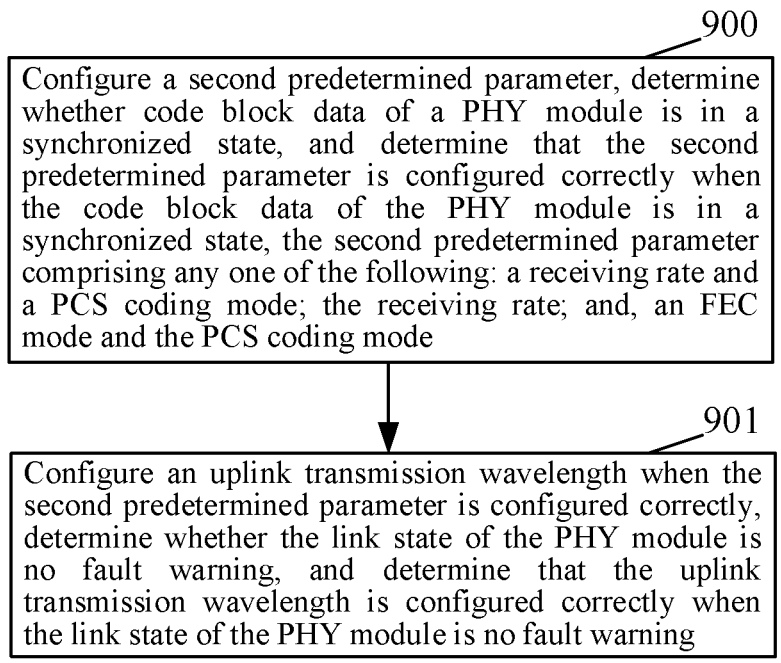
FIG. 9 is a flowchart of an optical link channel auto-negotiation method according to another embodiment of the present disclosure.

Referring to FIG. 9, another embodiment of the present disclosure provides an optical link channel auto-negotiation method, including at least one of the following steps S900 and S901.

At step S900, a second predetermined parameter is configured; and, it is determined whether code block data of a PHY module is in a synchronized state, and it is determined that the second predetermined parameter is configured correctly when the code block data of the PHY module is in a synchronized state, the second predetermined parameter including any one of the following: a receiving rate and a PCS coding mode; or, the receiving rate, an FEC mode and the PCS coding mode.

In the embodiment of the present disclosure, when the second predetermined parameter is configured initially, the second predetermined parameter may be configured as a default value or a previous matched value. When there is no default value or a previous matched value, an optional value may be arbitrarily selected for configuration.

At step S901, an uplink transmission wavelength is configured when the second predetermined parameter is configured correctly; and, it is determined whether the link state of the PHY module is no fault warning, and it is determined that the uplink transmission wavelength is configured correctly when the link state of the PHY module is no fault warning.

In the embodiment of the present disclosure, when the uplink transmission wavelength is configured initially, the uplink transmission wavelength may be configured as a default value or a previous matched value. When there is no default value or a previous matched value, an optional value may be arbitrarily selected for configuration.

In another embodiment of the present disclosure, when the code block data of the PHY module is not in a synchronized state, the method further includes the following steps:
    determining that the second predetermined parameter is configured incorrectly; and reconfiguring the second predetermined parameter, and continuously executing the step of determining whether the code block data of the PHY module is in a synchronized state.

In another embodiment of the present disclosure, when the link state of the PHY module is remote fault warning, the method further includes the following steps:

determining that the uplink transmission wavelength is configured incorrectly; and reconfiguring the uplink transmission wavelength, and continuously executing the step of determining whether the link state of the PHY module is no fault warning.

In the embodiment of the present disclosure, without additionally adding modulation and demodulation processing on the local terminal and the remote terminal and defining complex protocols, the second predetermined parameter and the uplink transmission wavelength are adaptively configured only by using the existing functions of the PHY module. Thus, the automatic adaptation and establishment of an optical link channel is realized simply, the cost for development and maintenance is reduced, and it is convenient for intercommunication of devices from different manufacturers.

In another embodiment of the present disclosure, when an optical module is in place or light is detected or there is no LOS warning, the step of configuring the receiving rate and the PCS coding mode or configuring the receiving rate, the FEC mode and the PCS coding mode is continuously executed.

Figure 10:
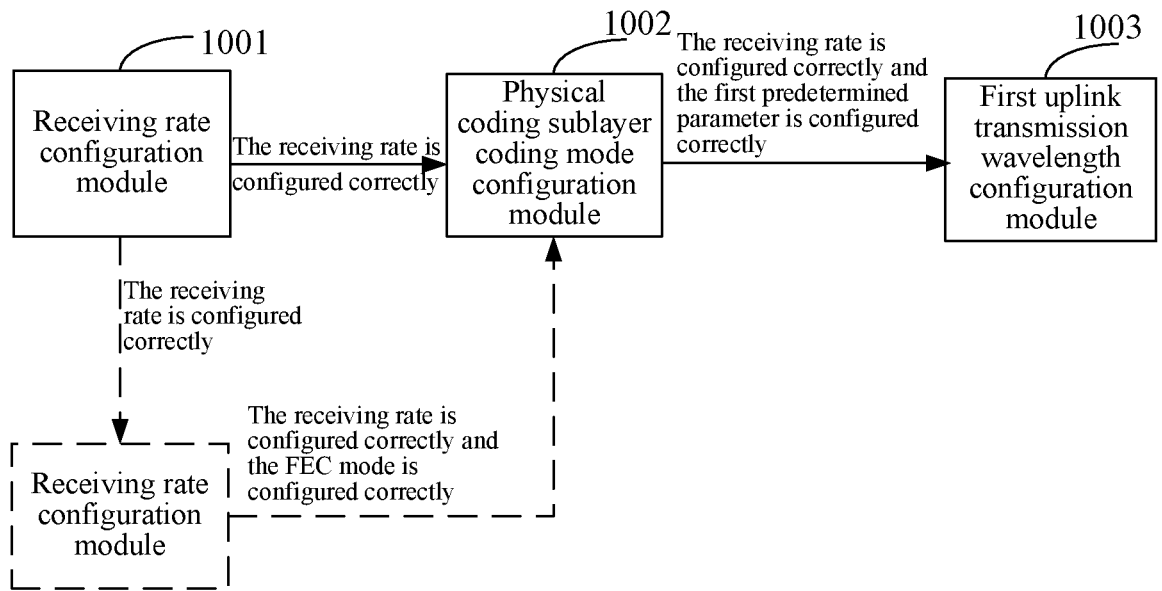
FIG. 10 is a structural diagram of an optical link channel auto-negotiation apparatus according to another embodiment of the present disclosure.

Referring to FIG. 10, another embodiment of the present disclosure provides an optical link channel auto-negotiation apparatus, including at least one of a receiving rate configuration module 1001, a PCS coding mode configuration module 1002 and a first uplink transmission wavelength configuration module 1003.

The receiving rate configuration module 1001 is configured to: configure a receiving rate, determine whether a receive clock recovered from received data by a PHY module is locked, and determine that the receiving rate is configured correctly when the receive clock recovered from the received data by the PHY module is locked.

The PCS coding mode configuration module 1002 is configured to: configure a first predetermined parameter when the receiving rate is configured correctly, determine whether code block data of the PHY module is in a synchronized state, and determine that the first predetermined parameter is configured correctly when the code block data of the PHY module is in a synchronized state. The first predetermined parameter includes any one of the following: a PCS coding mode; and, an FEC mode and the PCS coding mode.

The first uplink transmission wavelength configuration module 1003 is configured to: configure an uplink transmission wavelength when the receiving rate is configured correctly and the first predetermined parameter is configured correctly, determine whether the link state of the PHY module is no fault warning, and determine that the uplink transmission wavelength is configured correctly when the link state of the PHY module is no fault warning.

In another embodiment of the present disclosure, the apparatus further includes a forward error correction mode configuration module 1004.

The forward error correction mode configuration module 1004 is configured to: configure an FEC mode when the receiving rate is configured correctly, determine whether received data of an FEC or RS-FEC sublayer of the PHY module is in a synchronized state, and determine that the FEC mode is configured correctly when the received data of the FEC or RS-FEC sublayer of the PHY module is in a synchronized state.

The PCS coding mode configuration module 1002 is further configured to continuously execute the step of configuring the PCS coding mode when the receiving rate is configured correctly and the FEC mode is configured correctly.

In another embodiment of the present disclosure, the forward error correction mode configuration module 1004 is further configured to: determine that the FEC mode is configured incorrectly when the received data of the FEC or RS-FEC sublayer of the PHY module is not in a synchronized state; and, reconfigure the FEC mode, and continuously execute the step of determining whether the received data of the FEC or RS-FEC sublayer of the PHY module is in a synchronized state.

In another embodiment of the present disclosure, the receiving rate configuration module 1001 is further configured to: determine that the receiving rate is configured incorrectly when it is determined that the receive clock recovered from the received data by the PHY module is not locked; and, reconfigure the receiving rate, and continuously execute the step of determining whether the receive clock recovered from the received data by the PHY module is locked.

In another embodiment of the present disclosure, the PCS coding mode configuration module 1002 is further configured to: determine that the first predetermined parameter is configured incorrectly when the code block data of the PHY module is not in a synchronized state; and, reconfigure the first predetermined parameter, and continuously execute the step of determining whether the code block data of the PHY module is in a synchronized state.

In another embodiment of the present disclosure, the first uplink transmission wavelength configuration module 1003 is further configured to: determine that the uplink transmission wavelength is configured incorrectly when the link state of the PHY module is remote fault warning; and, reconfigure the uplink transmission wavelength, and continuously execute the step of determining whether the link state of the PHY module is no fault warning.

In another embodiment of the present disclosure, the receiving rate configuration module 1001 is further configured to continuously execute the step of configuring the receiving rate when an optical module is in place or light is detected or there is no LOS warning.

Figure 11:
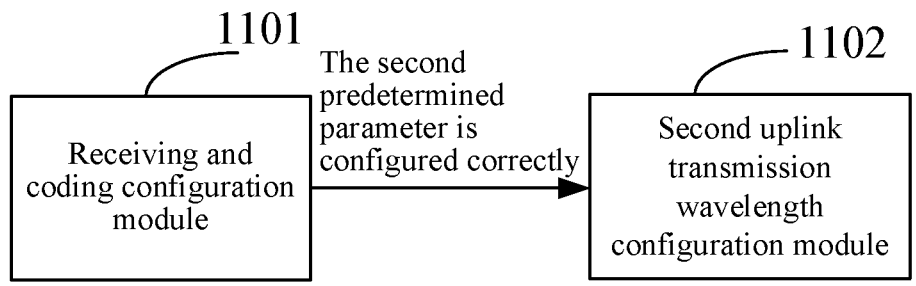
FIG. 11 is a structural diagram of an optical link channel auto-negotiation apparatus according to another embodiment of the present disclosure.

Referring to FIG. 11, another embodiment of the present disclosure provides an optical link channel auto-negotiation apparatus, including at least one of a receiving and coding configuration module 1101 and a second uplink transmission wavelength configuration module 1102.

The receiving and coding configuration module 1101 is configured to: configure a second predetermined parameter; determine whether code block data of a PHY module is in a synchronized state, and determine that the second predetermined parameter is configured correctly when the code block data of the PHY module is in a synchronized state. The second predetermined parameter includes any one of the following: a receiving rate and a PCS coding mode; the receiving rate; or, an FEC mode and the PCS coding mode.

The second uplink transmission wavelength configuration module 1102 is configured to: configure an uplink transmission wavelength when the second predetermined parameter is configured correctly, determine whether the link state of the PHY module is no fault warning, and determine that the uplink transmission wavelength is configured correctly when the link state of the PHY module is no fault warning.

In another embodiment of the present disclosure, the receiving and coding configuration module 1101 is further configured to: determine that the second predetermined parameter is configured incorrectly when the code block data of the PHY module is not in a synchronized state; and, reconfigure the second predetermined parameter, and continuously execute the step of determining whether the code block data of the PHY module is in a synchronized state.

In another embodiment of the present disclosure, the second uplink transmission wavelength configuration module 1102 is further configured to: determine that the uplink transmission wavelength is configured incorrectly when the link state of the PHY module is remote fault warning; and, reconfigure the uplink transmission wavelength, and continuously execute the step of determining whether the link state of the PHY module is no fault warning.

In another embodiment of the present disclosure, the receiving and coding configuration module 1101 is further configured to continuously execute the step of configuring the second predetermined parameter when an optical module is in place or light is detected or there is no LOS warning.

Another embodiment of the present disclosure provides an optical link channel auto-negotiation apparatus, including a processor and a computer-readable storage medium storing instructions which, when executed by the processor, cause the processor to perform any one of the optical link channel auto-negotiation methods described above.

An embodiment of the present disclosure provides a computer-readable storage medium storing computer programs which, when executed by a processor, cause the processor to perform the steps in any one of the optical link channel auto-negotiation methods described above.

Example One

Figure 12:
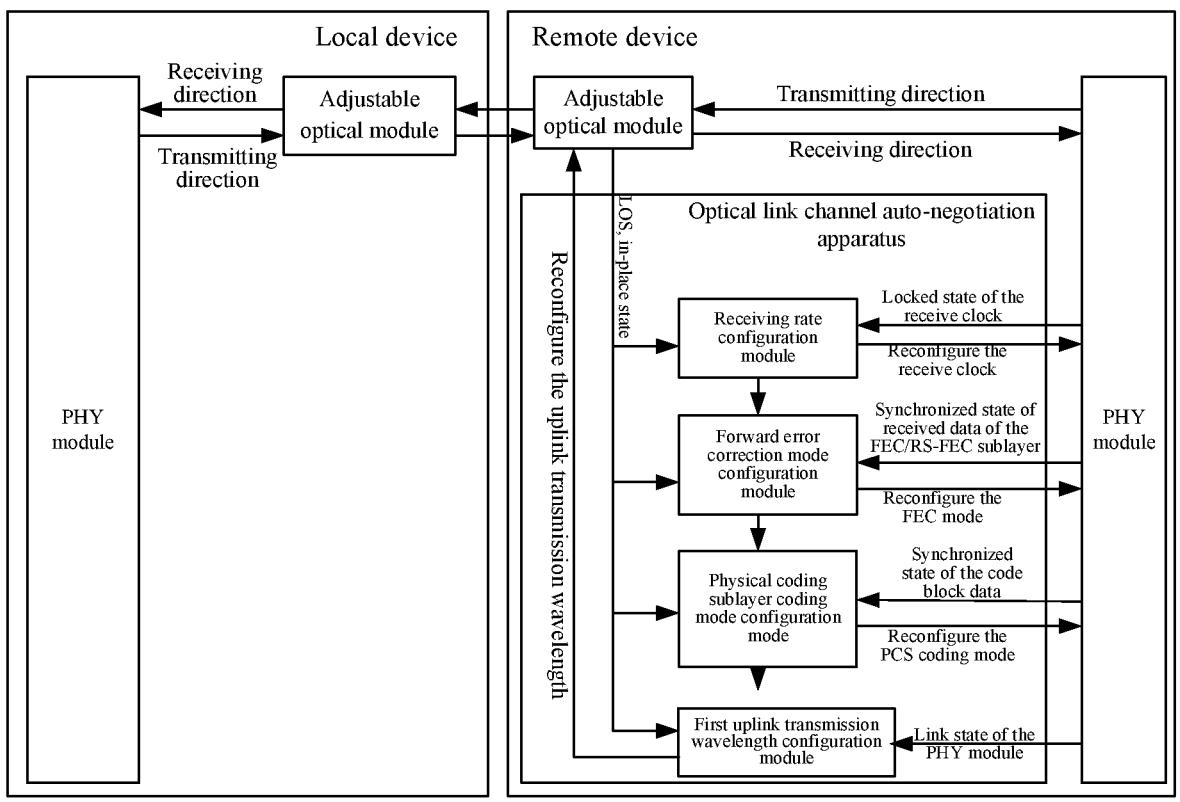
FIG. 12 is a schematic diagram of an optical link channel auto-negotiation apparatus in example one according to an embodiment of the present disclosure.

The optical link channel auto-negotiation apparatus in this example is shown in FIG. 12. In this example, the detection and matching of the receiving rate, PCS coding mode and FEC code of downlink signals are mainly realized by using a combination of the "adjustable optical module+PHY module" and by additionally providing the optical link channel auto-negotiation apparatus on the remote device side. In addition, a method for detecting and matching an uplink transmission wavelength is provided.

First of all, the prerequisite for all detection states to take effect is that: the optical module is in place and light is detected (i.e., no LOS warning). When the optical module is not in place or there is LOS warning, the optical link channel auto-negotiation apparatus may not be activated; and, when the optical module is in place or there is no LOS warning, the optical link channel auto-negotiation apparatus is automatically activated.

a) Receiving Rate Configuration Module

Its main function is to determine, according to the locked state of the receive clock of the PHY module, whether the current receiving rate is configured correctly, under the prerequisite that the PHY module recovers the receive block using received data by default.

A next processing flow can be executed only when the receiving rate is configured correctly. When the receiving rate is configured incorrectly, configuring the receiving rate and detecting the locked state of the receive clock will be executed cyclically all the time.

b) Forward Error Correction Mode Configuration Module (Optionally)

Its main function is to determine, according to the synchronized state of received data of the FEC/RS-FEC sublayer of the PHY module, whether the FEC mode is configured correctly.

The prerequisite is that a) can pass the detection. The forward error correction mode configuration module is an optional module, and FEC is not required in some service scenarios. In these scenarios, the detection is directly passed. A next processing flow can be executed only when the FEC mode is configured correctly. When the FEC mode is configured incorrectly, configuring the FEC mode and detecting the synchronized state of the received data of the FEC/RS-FEC sublayer will be executed cyclically all the time.

c) Physical Coding Sublayer Coding Mode Configuration Module

Its main function is to determine, according to the synchronized state of the code block data of the PHY module, whether the current PCS coding mode is configured correctly.

The prerequisite is that both a) and b) can pass the detection. The synchronized state of the code block data of the corresponding coding module is acquired in a different coding mode (e.g., 64B/66B, 8B/10B . . . ). A next processing flow can be executed only when the PCS coding mode is configured correctly. When the PCS coding mode is configured incorrectly, configuring the PCS coding mode and detecting the synchronized state of the code block data will be executed cyclically all the time.

d) First Uplink Transmission Wavelength Configuration Module

Its main function is to determine, according to the Local Fault or Remote Fault warning mechanism of the PHY module on both sides, whether the current uplink transmission wavelength is configured correctly.

The prerequisite is that the data channel in the downlink receiving direction is normal. That is, when a), b) and c) all pass the detection, it is considered that the receiving channel is normal. In addition, if the uplink transmission wavelength is configured in other ways, this module is not required.

Figure 13:
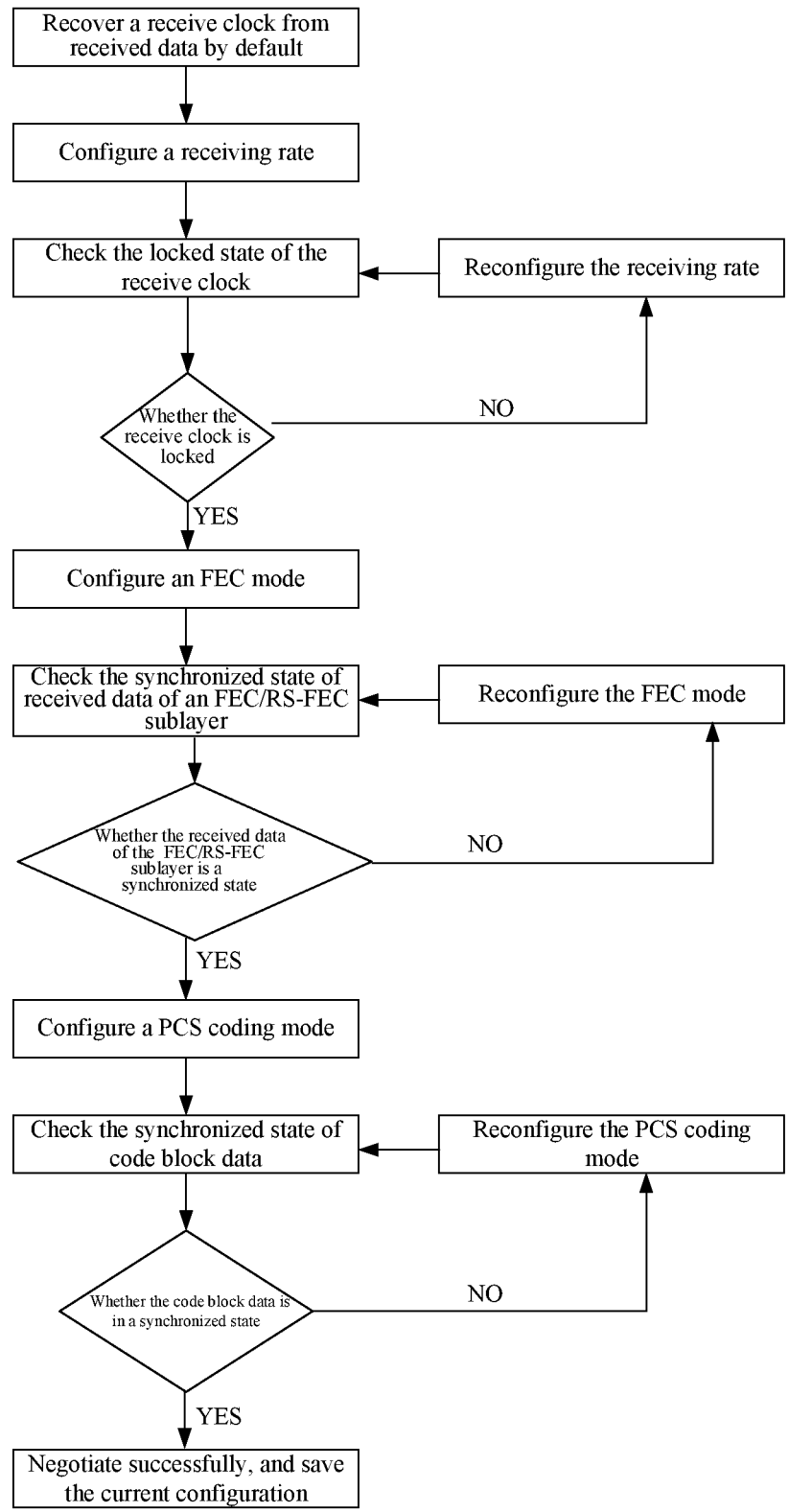
FIG. 13 is a flowchart of a method for adaptively configuring the receiving rate, PCS coding mode and FEC mode of a received downlink signal in example one according to an embodiment of the present disclosure.
Figure 14:
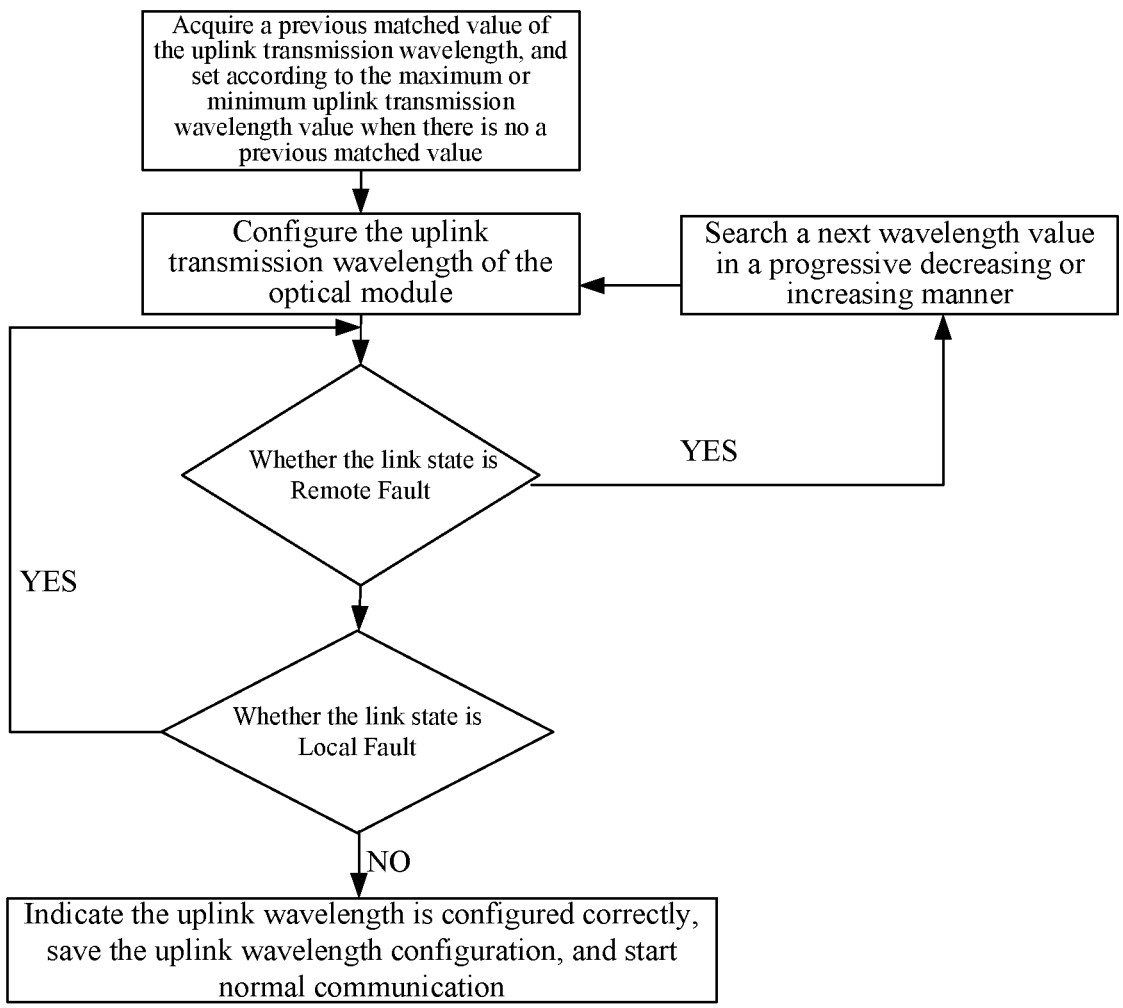
FIG. 14 is a flowchart of a method for adaptively configuring an uplink transmission wavelength in example one according to an embodiment of the present disclosure.

The flowchart of the optical link channel auto-negotiation method in this example is shown in FIGS. 13 and 14.

A) Downlink Receiving Direction

Upon initial power-up, the PHY module recovers a clock from the received data by default. When there is a receiving rate, a PCS coding mode and an FEC mode that are adapted previously, configuration may be performed according to this receiving rate, PCS coding and FEC mode. When there are no receiving rate, no PCS coding mode and no FEC mode that are adapted previously, setting is performed according to any optional configuration. There are usually several receiving rates, PCS coding modes and FEC modes commonly used, mainly depending on the design of the remote device itself.

The flowchart of the method for adaptively configuring the receiving rate, PCS coding mode and FEC mode of a received downlink signal is shown in FIG. 13, including the following steps.

I) A receive clock is recovered from received data by default, a receiving rate is configured, and it is determined whether the current receiving rate is configured correctly by inquiring whether the receive clock of the PHY module is locked. In an embodiment, when the receive clock of the corresponding PHY module is locked stably, it is considered that the receiving rate is configured correctly; and, when the receive clock of the corresponding PHY module is not locked, it is considered that the receiving rate is configured incorrectly, and then a next receiving rate configuration is switched to, and cyclic traversing is performed until the correct receiving rate configuration is found. For example, 25.78125G (25G Ethernet), 10.3125G (10G Ethernet), 24.33024G (CPRI Option 10), 10.1376G (CPRI Option 8), 9.8304G (CPRI Option 7), etc.

II) After the receiving rate is configured correctly, an FEC mode is configured, and it is determined whether the current FEC mode is configured correctly by inquiring a synchronized state of received data of an FEC/RS-FEC sublayer of the PHY module. In an embodiment, when the received data of the FEC/RS-FEC sublayer is in a synchronized state, it is considered that the FEC mode is configured correctly; and, when the received data of the FEC/RS-FEC sublayer is not in a synchronized state, it is considered that the FEC mode is configured incorrectly.

After both the receiving rate and the FEC mode are configured correctly, a PCS coding mode is configured, and it is determined whether the PCS coding mode is configured correctly by inquiring the aligned and synchronized state of the received code clock data of the corresponding PCS of the PHY module. In an embodiment, when the received code block data of the corresponding PCS of the PHY module is in an aligned and synchronized state, it is considered that the PCS coding mode is configured correctly; and, when the received code block data of the corresponding PCS of the PHY module is not in an aligned and synchronized state, it is considered that the PCS coding mode is configured incorrectly.

Since difference FEC modes are generally matched with corresponding PCS sublayers, two configurations may be combined for cyclical traversing, until the correct coding and FEC mode is found. After the receiving rate is configured correctly, the FEC mode and the PCS coding mode are configured, and it is determined whether the FEC mode and the PCS coding mode are configured correctly by inquiring the aligned and synchronized state of the received code clock data of the corresponding PCS of the PHY module. In an embodiment, when the received code block data of the corresponding PCS of the PHY module is in an aligned and synchronized state, it is considered that the FEC mode and the PCS coding mode are configured correctly; and, when the received code block data of the corresponding PCS of the PHY module is not in an aligned and synchronized state, it is considered that the FEC mode and the PCS coding mode are configured incorrectly. For example, 64B/66B+RS-FEC (528,514), 64B/66B+FEC (2112, 20180), 64B/66B+no FEC, 8B/10B+no FEC, etc.

B) Uplink Transmitting Direction (Optionally)

Upon initial power-up, when there are values matched previously, configuration may be performed according to the values matched previously. When there are no values matched previously, configuration is performed according to the maximum or minimum uplink transmission wavelength value of the hardware design of the optical module by default.

The flowchart of the method for adaptively configuring the uplink transmission wavelength is shown in FIG. 14, including the following steps.

The uplink transmission wavelength of the optical module is configured, and it is determined whether the uplink transmission wavelength is appropriate by inquiring the link state of the PHY module. In an embodiment, the link state (there are totally three states, i.e., OK (i.e., no fault warning), Local Fault warning and Remote Fault warning) of the corresponding PHY channel can be inquired after a certain uplink transmission wavelength is configured. When the link state is Remote Fault warning, it is considered that the uplink transmission wavelength is configured incorrectly, and a next wavelength value is switched to (cyclical traversing may be performed from small to large or from large to small); when the link state is OK, it is considered that the corresponding uplink transmission wavelength is found; and, when the link state is Local Fault warning, it is indicated that the link from the local device to the remote device is blocked, and the maintenance personnel is required to check whether the physical connection is normal at this time. In this way, the corresponding uplink transmission wavelength can be automatically found within a short time by cyclically continuous detection and switching, so that the plug-and-play purpose is achieved and it is very convenient.

Example Two

Figure 15:
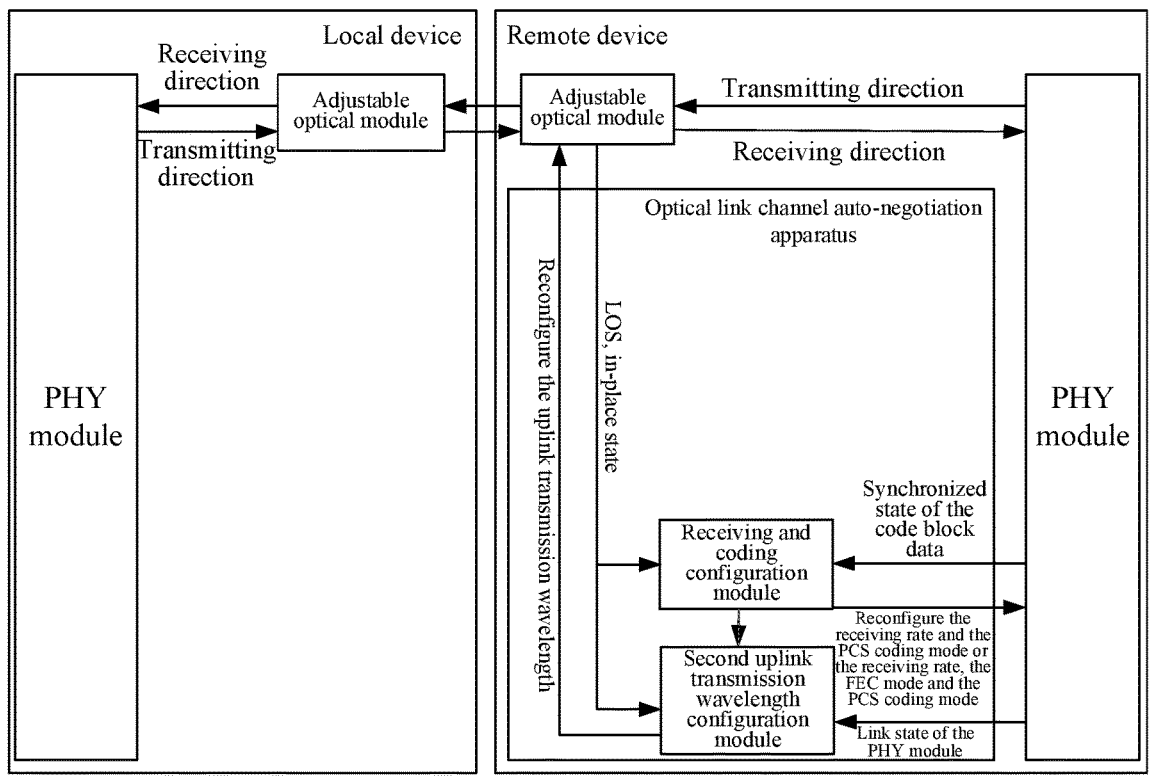
FIG. 15 is a schematic diagram of an optical link channel auto-negotiation apparatus in example two according to an embodiment of the present disclosure.

The optical link channel auto-negotiation apparatus in this example is shown in FIG. 15. In this embodiment, by using a combination of the "optical module+PHY module" and by acquiring the aligned and synchronized state of code clock data of the PCS sublayer, it is determined whether a certain combined configuration "receiving rate+FEC mode+PCS coding mode" is correct. Compared with example one, the logic and module for determining the receiving rate and FEC mode of the received signal are omitted.

First of all, the prerequisite for all detection states to take effect is that: the optical module is in place and light is detected (i.e., no LOS warning). When the optical module is not in place or there is LOS warning, the optical link channel auto-negotiation apparatus may not be activated; and, when the optical module is in place or there is no LOS warning, the optical link channel auto-negotiation apparatus is automatically activated.

a) Receiving and Coding Configuration Module

Its main function is to determine, according to the aligned and synchronized state of the code block data of the PHY module, whether the current configuration "receiving rate+FEC mode+PCS coding mode" is correct. In an embodiment, when the code block data of the PHY module is in an aligned and synchronized state, it is considered that the configuration "receiving rate+FEC mode+PCS coding mode" is correct; and, when the code block data of the PHY module is not in an aligned and synchronized state, it is considered that the configuration "receiving rate+FEC mode+PCS coding mode" is incorrect.

A next processing flow can be executed only when the receiving rate, the FEC mode and the PCS coding mode are configured correctly; and, when the receiving rate, the FEC mode and the PCS coding mode are configured incorrectly, configuring the receiving rate, the FEC mode and the PCS coding mode and detecting the aligned and synchronized state of the code block data will be executed cyclically all the time.

b) Transmission Wavelength Switching Apparatus

The function and implementation are the same as those in example one, under the prerequisite that a) passes the detection.

Figure 16:
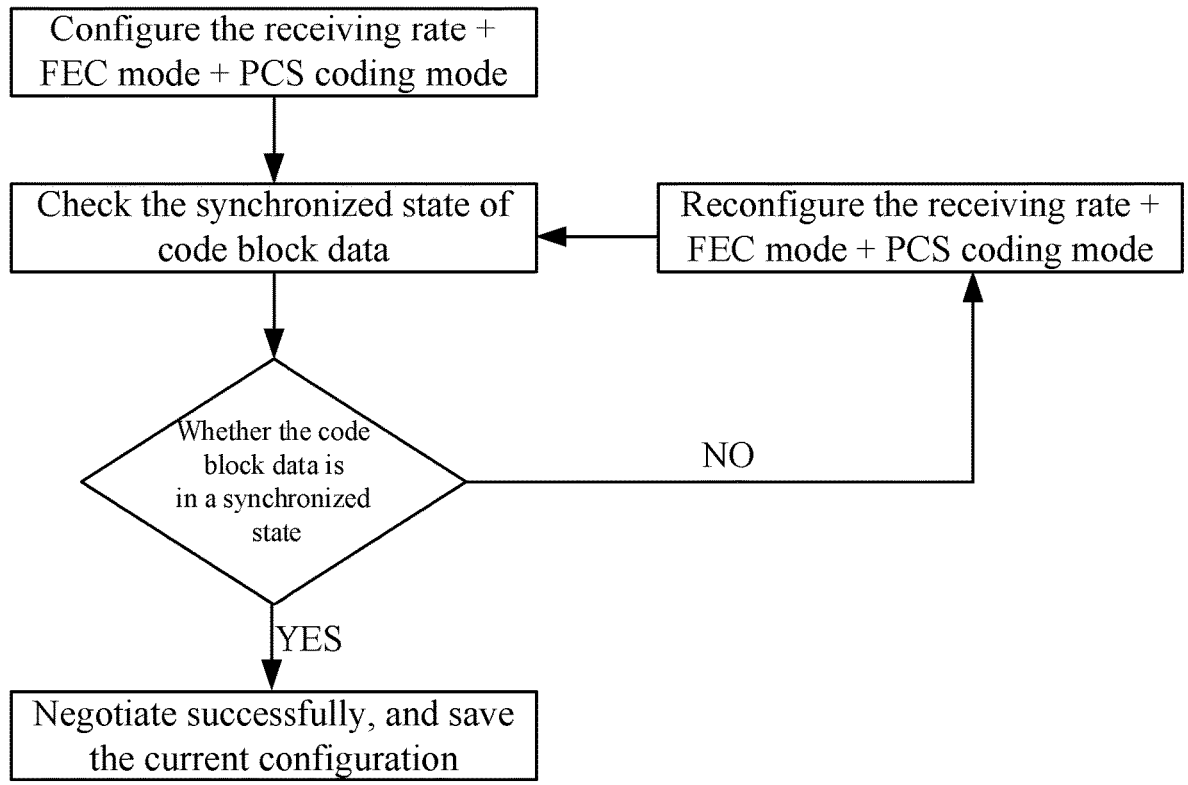
FIG. 16 is a flowchart of a method for adaptively configuring the receiving rate, PCS coding mode and FEC mode of a received downlink signal in example two according to an embodiment of the present disclosure.

The flowchart of the optical link channel auto-negotiation method in this example is shown in FIGS. 16 and 14.

A) Downlink Receiving Direction

The processing flow is the same as that in example one except for the only difference that the flow of confirming the receiving rate, FEC mode and the PCS coding mode of the received downlink signal is simplified.

A receiving rate+an FEC mode+a PCS coding mode are configured, and it is determined whether the current configuration "receiving rate+FEC mode+PCS coding mode" is correct by inquiring the aligned and synchronized state of the received code clock data of the corresponding PCS of the PHY module. Configurations of several common service scenarios may be traversed firstly. When the code block data can be aligned and synchronized in the receiving direction of the corresponding PCS sublayer, it can be considered that the "receiving rate+FEC mode+PCS coding mode" of the received code block data is correct; and, when the code block data cannot be aligned and synchronized in the receiving direction of the corresponding PCS sublayer, it can be considered that the "receiving rate+FEC mode+PCS coding mode" of the received code block data is incorrect, and a next configuration combination is switched to. Cyclical traversing is performed by the same method until the correct configuration combination is found. For example, [25.78125G (25G Ethernet)+RS-FEC (528,514)+64B/66B], [25.78125G (25G Ethernet)+no FEC+64B/66B], [10.3125G (10G Ethernet)+RS-FEC (528,514)+64B/66B], [10.3125G (10G Ethernet)+no FEC+64B/66B], [24.33024G (CPRI Option 10)+no FEC+64B/66B], [10.1376G (CPRI Option 8)+no FEC+64B/66B], [9.8304G (CPRI Option 7)+no FEC+8B/10B], etc.

B) Uplink Transmitting Direction (Optionally)

This section is the same as in example one.

It may be understood by those having ordinary skill in the art that function modules/units in all or part of the steps of the method, the system and the apparatus disclosed above may be implemented as software, firmware, hardware and appropriate combinations thereof. In the hardware implementation, the division of the function modules/units mentioned in the above description may not correspond to the division of physical components. For example, one physical component may have several functions, or one function or step may be implemented jointly by several physical components. Some or all components may be implemented as software executed by processors such as central processing units, digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those having ordinary skill in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random-access memory (RAM), a Read-Only Memory (ROM), an Electrically Erasable Programmable Read-Only Memory (EEPROM), a flash memory, or other memory technologies, a Compact Disc Read-Only Memory (CD-ROM), a Digital Video Disc (DVD) or other optical disc storage, a magnetic cassette, a magnetic tape, disk storage or other magnetic storage apparatuses, or any other medium used to store the desired information and accessible by a computer. In addition, as is known to those having ordinary skill in the art, the communication medium generally includes computer-readable instructions, data structures, program modules or other data in modulated data signals such as carriers or other transmission mechanisms, and may include any information delivery medium.

The invention claimed is:

1. An optical link channel auto-negotiation method, comprising:
    configuring a receiving rate, determining whether a receive clock recovered from received data by a physical layer (PHY) module is locked, and in response to determining that the receive clock recovered from the received data by the PHY module is locked, determining that the receiving rate is configured correctly;
    configuring a first predetermined parameter in response to determining that the receiving rate is configured correctly, determining whether code block data of the PHY module is in a synchronized state, and in response to determining that the code block data of the PHY module is in a synchronized state, determining that the first predetermined parameter is configured correctly, the first predetermined parameter comprising any one of the following: a physical coding sublayer (PCS) coding mode; or, a forward error correction (FEC) mode and the PCS coding mode; and
    configuring an uplink transmission wavelength in response to determining that the receiving rate is configured correctly and the first predetermined parameter is configured correctly, determining whether the link state of the PHY module is no fault warning, and in response to determining that the link state of the PHY module is no fault warning, determining that the uplink transmission wavelength is configured correctly.

2. The method of claim 1, wherein the first predetermined parameter is the PCS coding mode, and in response to determining that the receiving rate is configured correctly, the method further comprises:
    configuring the FEC mode, determining whether received data of an EFC or Reed Solomon forward error correction (RS-FEC) sublayer of the PHY module is in a synchronized state, and in response to determining that the received data of the EFC or RS-FEC sublayer of the PHY module is in a synchronized state, determining that the FEC mode is configured correctly; and
    in response to determining that the receiving rate is configured correctly and the FEC mode is configured correctly, continuously executing the step of configuring the first predetermined parameter.

3. The method of claim 1, wherein, in response to determining that the received data of the EFC or RS-FEC sublayer of the PHY module is not in a synchronized state, the method further comprises:
    determining that the FEC mode is configured incorrectly; and
    reconfiguring the FEC mode, and continuously executing the step of determining whether the received data of the EFC or RS-FEC sublayer of the PHY module is in a synchronized state.

4. The method of claim 2, wherein, in response to determining that the receive clock recovered from the received data by the PHY module is not locked, the method further comprises:
    determining that the receiving rate is configured incorrectly; and
    reconfiguring the receiving rate, and continuously executing the step of determining whether the receive clock recovered from the received data by the PHY module is locked.

5. The method of claim 1, wherein, in response to determining that the code block data of the PHY module is not in a synchronized state, the method further comprises the following steps:

determining that the first predetermined parameter is configured incorrectly; and reconfiguring the first predetermined parameter, and continuously executing the step of determining whether the code block data of the PHY module is in a synchronized state.

6. The method of claim 2, wherein, in response to determining that the link state of the PHY module is remote fault warning, the method further comprises:

determining that the uplink transmission wavelength is configured incorrectly; and reconfiguring the uplink transmission wavelength, and continuously executing the step of determining whether the link state of the PHY module is no fault warning.

7. The method of claim 1, wherein, in response to determining that an optical module is in place or light is detected or there is no loss of signal (LOS) warning, the step of configuring the receiving rate is continuously executed.

8. A non-transitory computer-readable storage medium storing computer programs which, when executed by a processor, cause the processor to perform the steps in the optical link channel auto-negotiation method of claim 1.

9. The method of claim 1, wherein, in response to determining that the receive clock recovered from the received data by the PHY module is not locked, the method further comprises:

determining that the receiving rate is configured incorrectly; and reconfiguring the receiving rate, and continuously executing the step of determining whether the receive clock recovered from the received data by the PHY module is locked.

10. The method of claim 2, wherein, in response to determining that the code block data of the PHY module is not in a synchronized state, the method further comprises the following steps:

determining that the first predetermined parameter is configured incorrectly; and reconfiguring the first predetermined parameter, and continuously executing the step of determining whether the code block data of the PHY module is in a synchronized state.

11. The method of claim 1, wherein, in response to determining that the link state of the PHY module is remote fault warning, the method further comprises:

determining that the uplink transmission wavelength is configured incorrectly; and reconfiguring the uplink transmission wavelength, and continuously executing the step of determining whether the link state of the PHY module is no fault warning.

12. The method of claim 2, wherein, in response to determining that an optical module is in place or light is detected or there is no loss of signal (LOS) warning, the step of configuring the receiving rate is continuously executed.

13. An optical link channel auto-negotiation method, comprising at least one of the following:

configuring a predetermined parameter, determining whether code block data of a physical layer (PHY) module is in a synchronized state, and in response to determining that the code block data of the PHY module is in a synchronized state, determining that the predetermined parameter is configured correctly, the predetermined parameter comprising any one of the following: a receiving rate and a physical coding sublayer (PCS) coding mode; the receiving rate; or, a forward error correction (FEC) mode and the PCS coding mode; and configuring an uplink transmission wavelength in response to determining that the predetermined parameter is configured correctly, determining whether the link state of the PHY module is no fault warning, and in response to determining that the link state of the PHY module is no fault warning, determining that the uplink transmission wavelength is configured correctly.

14. The method of claim 13, wherein, in response to determining that the code block data of the PHY module is not in a synchronized state, the method further comprises:

determining that the second predetermined parameter is configured incorrectly; and reconfiguring the second predetermined parameter, and continuously executing the step of determining whether the code block data of the PHY module is in a synchronized state.

15. The method of claim 13, wherein, in response to determining that the link state of the PHY module is remote fault warning, the method further comprises the following steps:

determining that the uplink transmission wavelength is configured incorrectly; and reconfiguring the uplink transmission wavelength, and continuously executing the step of determining whether the link state of the PHY module is no fault warning.

16. The method of claim 15, wherein, in response to determining that an optical module is in place or light is detected or there is no loss of signal (LOS) warning, the step of configuring the second predetermined parameter is continuously executed.

17. An optical link channel auto-negotiation apparatus, comprising a processor and a computer-readable storage medium storing instructions which, when executed by the processor, cause the processor to perform an optical link channel auto-negotiation method, the optical link channel auto-negotiation method comprising:

configuring a receiving rate, determining whether a receive clock recovered from received data by a physical layer (PHY) module is locked, and in response to determining that the receive clock recovered from the received data by the PHY module is locked, determining that the receiving rate is configured correctly;

configuring a first predetermined parameter in response to determining that the receiving rate is configured correctly, determining whether code block data of the PHY module is in a synchronized state, and in response to determining that the code block data of the PHY module is in a synchronized state, determining that the first predetermined parameter is configured correctly, the first predetermined parameter comprising any one of the following: a physical coding sublayer (PCS) coding mode; or, a forward error correction (FEC) mode and the PCS coding mode; and configuring an uplink transmission wavelength in response to determining that the receiving rate is configured correctly and the first predetermined parameter is configured correctly, determining whether the link state of the PHY module is no fault warning, and in response to determining that the link state of the PHY module is no fault warning, determining that the uplink transmission wavelength is configured correctly.

18. The method of claim 17, wherein, in response to determining that an optical module is in place or light is detected or there is no loss of signal (LOS) warning, the step of configuring the second predetermined parameter is continuously executed.

* * * * *